United States Patent [19]

Neff et al.

[11] Patent Number: 4,494,779
[45] Date of Patent: Jan. 22, 1985

[54] CONNECTOR FITTING FOR ELECTRICAL BOX

[75] Inventors: Steven W. Neff, Clinton, Iowa; Richard J. Borsh, Chagrin Falls, Ohio

[73] Assignee: Thyssen-Bornemisza Inc., New York, N.Y.

[21] Appl. No.: 398,096

[22] Filed: Jul. 14, 1982

[51] Int. Cl.³ .................................................. F16L 3/02
[52] U.S. Cl. ...................................... 285/159; 285/423; 285/DIG. 22; 174/65 R
[58] Field of Search .............. 285/159, 162, 194, 203, 285/205, 215, 216, 423, DIG. 22; 174/65 R, 65 G, 153 G

[56] References Cited

U.S. PATENT DOCUMENTS

| | | | |
|---|---|---|---|
| 2,420,826 | 5/1947 | Irrgang | 174/153 G |
| 3,148,899 | 9/1964 | Grinstead | 285/159 |
| 3,424,416 | 1/1969 | Dell et al. | 285/159 X |
| 4,192,477 | 3/1980 | Decky et al. | 285/162 X |
| 4,248,459 | 2/1981 | Pate et al. | 285/322 X |
| 4,302,035 | 11/1981 | Ochwat | 285/215 X |

Primary Examiner—Dave W. Arola
Attorney, Agent, or Firm—William R. Laney

[57] ABSTRACT

A connector fitting by which corrugated conduit can be quickly connected to an electrical box. The fitting includes a pair of hingedly interconnected semi-cylindrical collars. Two spaced, box engaging projections are carried on, and extend axially from each of the semi-cylindrical collars, and the inner side of each semi-cylindrical collar is grooved to mate with and engage corrugations carried exteriorly on a corrugated conduit to be connected to an electrical box by the use of the fitting. Each of the box engaging projections includes a wedge shaped free end portion and a web portion by which the wedge shaped free end portion is connected to one of the respective collars. Each wedge-shaped end portion, its associated web portion and the collar to which the web portion is connected define an arcuate channel or relief for receiving and engaging the portion of the wall of an electrical box which surrounds an opening into which the connector fitting is snapped.

2 Claims, 6 Drawing Figures

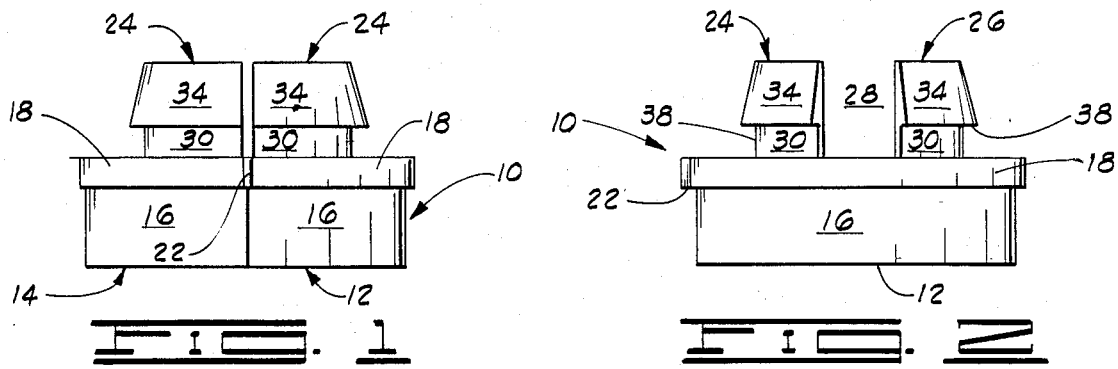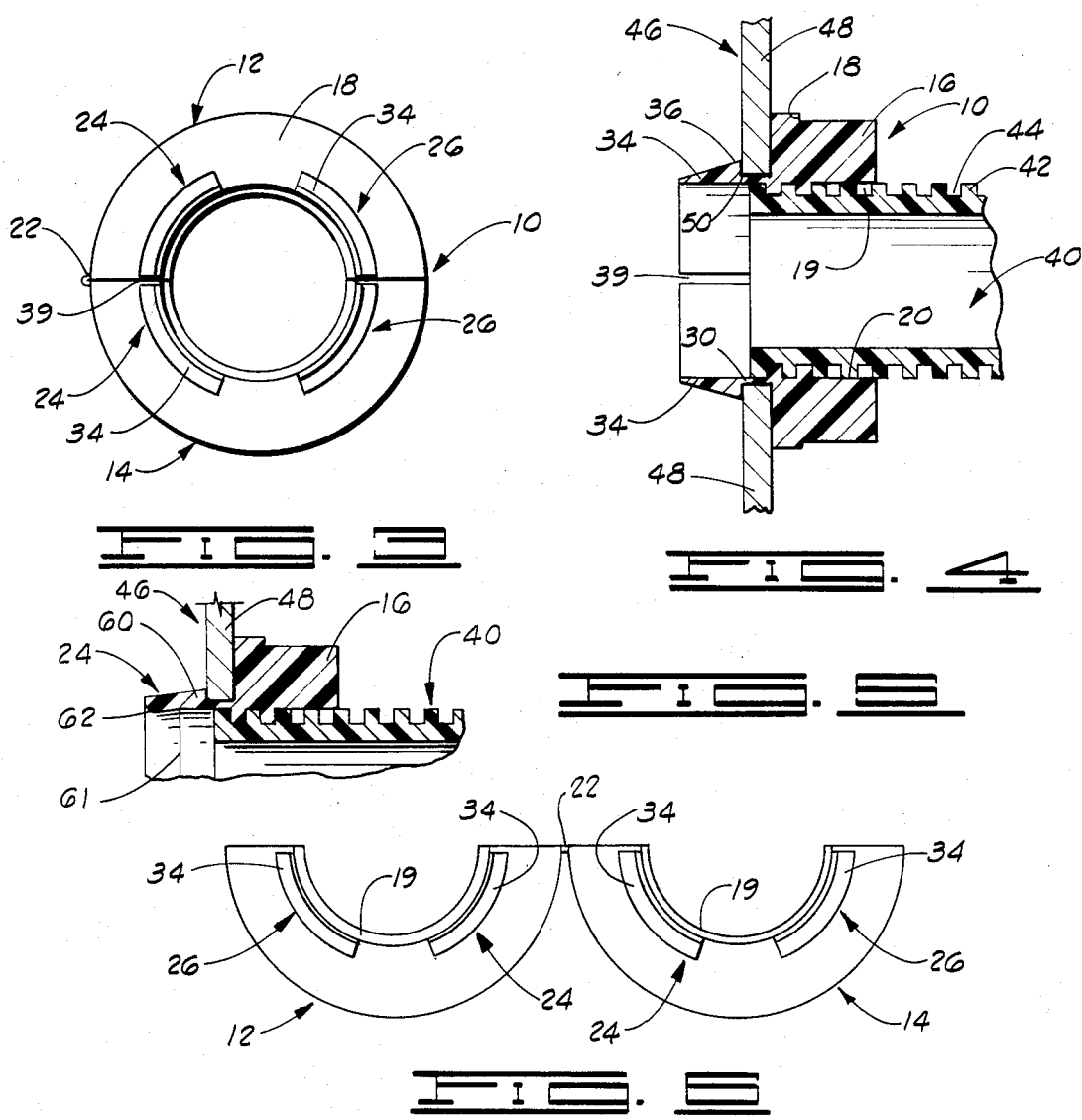

CONNECTOR FITTING FOR ELECTRICAL BOX

BACKGROUND OF THE INVENTION

1. Field of the Invention

This invention relates to synthetic resin fittings used in an electrical service system for interconnecting wire carrying conduits to electrical boxes, and more particularly, for interconnecting a synthetic resin electrical box with a synthetic resin externally corrugated conduit.

2. Brief Description of the Prior Art

In electrically wiring a commercial or residential facility, wall or ceiling mounted electrical service boxes are provided and various types of electrical conductors are extended from these boxes to outlets or points of electrical usage throughout the facility. A practice increasingly favored in many installations is to encase or sheath the electrical conductors in various types of flexible conduits. These conduits are frequently constructed and dimensioned so that they may be easily bent or curved to facilitate selective directional extension of the conductors and the enclosing conduit as may be required in the course of installation.

One technique used to impart flexibility without significant loss of mechanical properties in such conduit is the practice of forming the conduit in corrugated form so that the corrugations facilitate flexure of the conduit in substantially any direction without cracking or weakening. More recently, and increasingly, such conduit has been formed from various synthetic resin materials.

Since the time required for, and the ease of, installation of the described electrical systems are very important considerations in their usage by electricians, improvements in components of the system which improve the ease of installation or reduce the time required to incorporate such components are of substantial value.

In systems of the type described which include electrical boxes and externally corrugated conduits in which the conductors are enclosed, a means of connecting the conduit to the box is required. To this end, various types of connector fittings have heretofore been proposed and many of those proposed have been utilized. One such type is that which is illustrated and described in U.S. Pat. No. 4,248,459, assigned to the assignee of the present application. The connector fitting there depicted is a synthetic resin structure which has a cylindrical portion of tapered configuration so that it may be snapped into a circular opening formed in an electrical box. The fitting carries grooves or ridges adapted to engage the external corrugations on a conduit of the type described so that the conduit is engaged with the electrical box when the fitting has been snapped into place in the manner described.

Other fittings of this general character and mode of usage are those which are illustrated and described in U.S, Pat. Nos. 3,831,985; 3,953,555 and 1,830,250.

BRIEF DESCRIPTION OF THE PRESENT INVENTION

The present invention is an improved connector fitting useful for connecting an externally corrugated conduit to the wall of an electrical box. The fitting is especially designed and constructed to expedite the two basic manipulations which are generally involved in every system which requires connection of a corrugated conduit to an electrical box, i.e. engagement of the fitting with the conduit, and engagement of the fitting with the box so that conduit and box are interconnected through the instrumentality of the fitting. The fitting of the invention can be as quickly connected to the conduit as the conduit can be placed in contact with the fitting, and solely by manual effort, and the fitting and conduit can then be engaged with the box by the simple expedient of snapping a portion of the fitting through the opening formed in the wall of the box.

Broadly described, the connector fitting of the invention includes a pair of preferably identical, semi-cylindrical conduit-engaging collars which are interconnected by a hinge element to facilitate opening the collars apart from each other, or closing them to form a cylindrically configured collar. Each of the collars includes a concave inner side which carries alternating ribs and grooves configured and dimensioned to interlock with corrugations on the outer side of the conduit to be engaged by the fitting. Projecting from one side of each of the collars are a pair of spaced, box-engaging projections. Each of these projections includes a web portion, which is immediately adjacent and secured to the respective collar, and a wedge-shaped free outer end portion, which is secured to the web portion and thereby connected to the collar. Each of the projections defines with the collar to which it is secured, an arcuate groove or recess between its wedge shaped end portion and the collar.

In the use of the connector fitting, the semi-cylindrical collars are hingedly closed about the corrugated conduit to be connected to the electrical box to thereby engage the ribs with the corrugations. This action places the several box engaging projections in a generally cylindrical array, and the fitting is then snapped into the box by pressing the wedge-shaped end portions of the several projections through the opening in the box so that the wall of the box surrounding the opening therethrough engages the groove or recess defined between the wedge-shaped end portions of the projections and the semi-cylindrical collars.

An important object of the present invention is to provide a connector fitting which can be relatively economically constructed by the molding of a synthetic resin material, and which can be employed to quickly interconnect an externally corrugated conduit used in an electrical service system with an electrical outlet box.

Another object of the invention is to provide a connector fitting which can be used to connect variously sized corrugated conduits to an electrical outlet box.

A further object of the invention is to provide a connector fitting which is characterized in having a relatively long and trouble-free operating life.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of a connector fitting constructed in accordance with the invention.

FIG. 2 is a side elevation view of the connector fitting showing its appearance at a viewpoint located 90° around the fitting from the point of observation presented in FIG. 1.

FIG. 3 is a plan view of the connector fitting.

FIG. 4 is a sectional view taken through the connector fitting of the invention along an axis thereof and showing, in section, a portion of a corrugated conduit and an electrical outlet box which are interengaged by means of the connector fitting.

FIG. 5 is a partial sectional view of a modified embodiment of the connector fitting of the invention as it appears when used for interconnecting a corrugated conduit with an electrical box.

FIG. 6 is a plan view similar to FIG. 3, but illustrating the connector fitting when it is opened about a hinge forming a part of the fitting, and preparatory to having a corrugated conduit placed within the fitting.

DETAILED DESCRIPTION OF PREFERRED EMBODIMENTS OF THE INVENTION

The connector fitting of the invention is designated generally by reference numeral 10, and as illustrated in FIGS. 1, 3 and 5, includes a pair of semi-cylindrical collars 12 and 14. Each of the collars 12 and 14 includes a semi-cylindrical body portion 16 of generally rectangular cross sectional configuration, and a peripheral, radially outwardly extending facing flange 18. At the concave inner side of each of the semi-cylindrical collar portions 12 and 14, each collar portion carries a plurality of arcuate ribs 19 which are separated by grooves or channels 20. The semi-cylindrical collars 12 and 14 are movably interconnected to each other by an interconnecting hinge web 22 formed to the flanges 18. The hinge web 22 permits the semi-cylindrical collars 12 and 14 to be opened apart to the position illustrated in FIG. 6.

A pair of spaced, box-engaging projections 24 and 26 extend axially from each of the collars 12 and 14 at the end thereof which carries the radially outwardly projecting flange 18. As best shown in FIG 2, the projections 24 and 26 on each of the collars 12 and 14 are circumferentially spaced from each other by a gap 28.

Each of the projections 24 and 26 includes a web portion 30 which is secured to, and extends axially from, the respective collar 12 or 14. Each of the projections 24 and 26 also includes a wedge-shaped, free outer end portion 34 connected to the opposite end of the web portion 30 from the respective collar and tapering from a relatively thin, free outer end to a relatively thick base portion 36. It will be perceived in referring to FIGS. 1, 2 and 3 that the wedge-shaped portions 34, web portions 30 and collars 12 and 14 define an arcuate groove or recess 38 which is disposed between the respective wedge-shaped portion and the respective collar.

At a time when the collars 12 and 14 are closed into abutting contact with each other, as shown in FIG. 3, the boxengaging projections on adjacent collars are separated from each other by a gap 39.

In FIG. 4 of the drawings, a connector fitting 10 is shown in use for connecting an externally corrugated conduit, used for enclosing electrical conductors to an electrical outlet box. The conduit is designated generally by reference numeral 40 and is illustrated as defining a plurality of ribs 42 and grooves 44 extending circumferentially around the outer side thereof. An electrical box is denominated by reference numeral 46 and includes a side wall 48 which defines a circular opening 50 facilitating access to the inside of the box.

Operation

In utilizing the connector fitting 10 of the invention, the fitting is first opened to the position shown in FIG. 6. This is easily accomplished by pivoting the semi-cylindrical collars 12 and 14 about the hinge web 22 so that the collars are opened apart as shown.

After the collars 12 and 14 have been opened apart, the end of a corrugated conduit 40 is placed against the inner side of one of the collars so that its corrugations register with the grooves 20 and ribs 19 carried on the concave inner side of the collar. The other of the collars is then pivoted about the hinge web 22 to close it upon the corrugated conduit and bring its ribs and grooves into registration with the ribs and grooves of the conduit corrugations.

With the collars 12 and 14 are closed about the conduit, the body portions 16 of the two collars are gripped between the thumb and fingers to retain the connector closed about the conduit and permit the box-engaging projections 24 and 26 to be aligned with, and pressed into, the opening 50 in the side wall 48 of the box 46. By pressing upon the connector 10 in an axial direction, and concurrently retaining the collars 12 and 14 in their closed position, the wedge-shaped end portions 34 of the box-engaging projections 24 and 26 are forced through the opening 50 until the wall 48 of the box snaps into the groove or recess 38 to the position illustrated in FIG. 4. When the wall of the box 46 has snapped into engagement with the connector 10 in this fashion, the two collars 12 and 14 of the connector 10 are clamped by the box wall around the conduit, and the collars are prevented from opening apart from each other.

It will be perceived, from the described mode of utilization of the connector fitting, that the fitting is susceptible to use on variously sized corrugated conduits. Thus, the semi-cylindrical collars 12 and 14 need not be brought to their completely closed position around the conduit in order to effect engagement with the conduit assuring its position of engagement in relation to the box. It will also be noted that the particular number and arrangement of the box engaging projections assure that there is sufficient flexibility afforded by the web portions 30 that the connector fitting can be pressed through variously sized openings into electrical boxes having differing constructions.

Finally, since the depths of the grooves 20 places the bottom of these grooves substantially in alignment with the arcuate inner peripheral surfaces of both the wedge-shaped end portions and the web portions of the respective box-engaging projections, the corrugated conduit which is engaged by the connector fitting can be located at any of a variety of selected positions within the connector in the axial sense. Stated differently, should it be desirable to achieve greater mechanical stability, or for reasons dictated by the type of electrical connection to be made inside the box 46, the conduit 40 may be placed within the fitting 10 so that its end extends into the box to a location inwardly of the inner end of the wedge-shaped end portions 34 of the fitting.

In FIG. 5 of the drawings, a slightly modified embodiment of the invention is illustrated. Where identical structural elements have been used in the portion of this embodiment illustrated in FIG. 5, such structural elements of identical character have been identified by identical reference numerals.

The embodiment of the invention illustrated partially in FIG. 5 includes a connector fitting which differs from the embodiment previously described principally in the shape of the free outer end portions 60 carried at the ouer ends of the projections 24 and 26 and joined by web portions 30 to the respective collars 12 and 14. As shown in FIG. 5, the outer end portion 60 is angulated radially inwardly toward its outer end with the angle formed along the line 61 as shown in FIG. 5. The free outer edge of the outer end portion carries a radius 62 which rounds the inner side of the outer free end adjacent its edge located inside the synthetic resin electrical box 48.

The embodiment of the invention depicted in FIG. 5 assures that in installations where the corrugated conduit 40 is terminated outwardly from the axially inner free end of the connector fitting, and the insulated electrical conductor is connected inside the electrical box so that it extends across and in contact with the outer end portion 60 of one of the respective projections 24 and 26, the radius provided at this location will assure that chafing or cutting through of the insulation on the electrical conductor will not occur.

Such radiusing is facilitated by the relatively greater thickness of the free end portions 60 of the projections 24 and 26 and such increased thickness is attained without sacrificing flexibility in the end portions 60 of the projections 24 and 26 by reason of the angulation which permits the outer end portions to undergo flexure and constriction when the connector fitting is pressed through the opening 50 in the wall 48 of the electrical box 46.

Although preferred embodiments of the invention have been herein described in order to afford guidance to those skilled in the art as to the manner in which the invention is to be practiced, various changes and innovations can be made in the depicted forms of the invention without departure from the basic principles upon which it is based. Changes and innovations of this type are therefore deemed to be circumscribed by the spirit and scope of the invention except as the same may be necessarily limited by the appended claims, or reasonable equivalents thereof.

What is claimed is:

1. A synthetic resin connector fitting for interconnecting an externally corrugated conduit with an electrical box having a wall with an aperture therethrough, said connector fitting comprising:
    a pair of semi-cylindrical collars, each of said collars including a concave inner side having alternating grooves and ribs formed therein for the reception of a corrugated conduit, and having a concave outer side, each of said collars further including:
    a semi-cylindrical body portion having a rectagular cross-sectional axial configuration; and
    a peripheral, radially outwardly extending facing flange on the concave outer side of the respective collar and adjacent one end thereof;
    a flexible hinge web interconnecting the semi-cylindrical collars by connection to the peripheral, radially outwardly extending facing flange on each of said collars, said hinge web facilitating the pivotation of the semi-cylindrical collars into a cylindrical collective array in which said collars abut each other along a common plane extended diametrically across the cylindrical collective array, and alternately, facilitating the pivotal opening of said collars apart from each other so that each of said semi-cylindrical body portions lies along a common plane;
    a pair of spaced, box-engaging projections extending axially from each of said semi-cylindrical collars at the end thereof adjacent which the respective facing flange is located, each of said box-engaging projections having an arcuate cross-sectional configuration conforming to a segment of a circle of substantially less than 90° of arc, and said projections each further including:
    a flexible web portion connected to the semi-cylindrical body portion of the respective one of said semi-cylindrical collars; and
    a wedge-shaped outer end portion connected to the web portion and defining with said web portion and with said semi-cylindrical body portion of the respective collar, an arcuate box wall-receiving recess, said recess being spaced from all of the ribs on the respective collar in an axial direction toward said wedge-shaped outer end portion, said box-engaging projections being dimensioned and positioned on their respective collars so that adjacent projections in a pair of projections in which the two projections of said pair are located on different collars are spaced from each other when said collars are pivoted into a cylindrical array with the semi-cylindrical body portions thereof in abutting contact with each other whereby the wedge-shaped outer end portions of said projections can flex freely radially inwardly without contacting and interfering with each other.

2. A synthetic resin connector fitting as defined in claim 1 wherein each of said wedge-shaped portions has a free end portion angulated radially inwardly at a location spaced axially from said web portion, and further includes an inwardly radiused free outer edge on the opposite side of the respective wedge-shaped outer end portion from the side of the wedge-shaped outer end portion connected to the respective web portion.

* * * * *